Dec. 31, 1968            A. M. FIORI            3,419,677

APPARATUS FOR MONITORING HIGH SPEED PROCESSES

Filed March 26, 1965            Sheet 1 of 2

INVENTOR:
ANTHONY M. FIORI
BY Howson & Howson
ATTYS.

INVENTOR:
ANTHONY M. FIORI

United States Patent Office 3,419,677
Patented Dec. 31, 1968

3,419,677
APPARATUS FOR MONITORING HIGH
SPEED PROCESSES
Anthony M. Fiori, Philadelphia, Pa., assignor to John F.
McCarthy, Inc., Philadelphia, Pa., a corporation of
Pennsylvania
Filed Mar. 26, 1965, Ser. No. 443,025
3 Claims. (Cl. 178—6.8)

ABSTRACT OF THE DISCLOSURE

Sensing means scans a region of a periodically repeating pattern such as multi-color printing on a proper web and produces a control pulse upon the detection of a predetermined repeating part of the pattern within each repeat length. In response to the control pulse, a stroboscopic light source is energized to illuminate at least a selected portion within each repeat length of the pattern, such as a register mark. A television camera receives an image of the selected portion of the pattern when illuminated by the stroboscopic light. This image is reproduced on a television monitor, which is part of a closed television circuit. Preferably the image tube of the camera is provided with a high persistence coating so as to provide a sustained image. In preferred embodiments, switch actuator means actuates a trigger pulse switch once each repeat length of the pattern. By requiring coincidence of the control and trigger pulses the trigger pulses generated by this switch act to discriminate against signals which might otherwise produce unwanted energization of the stroboscopic light.

---

The present invention relates to an apparatus for monitoring high speed processes, and, more particularly, to a system suitable for monitoring periodically repeating register marks on a moving web of a multicolor printing press or the like.

There are many applications in which it is desirable to be able to monitor a periodically repeating pattern associated with a high speed process. The high speed process with which the present invention is primarily concerned in monitoring is the repetitive printed impressions made of intervals on a continuous web of sheet material of multicolor printing press. In such a multicolor printing process it is desirable for the pressman to monitor the repeating pattern to determine characteristics of the printing, such as accuracy of color registration. Such a determination is especially useful immediately after printing of the color pattern while the press is in operation, so that any error in accuracy of spacing of the impressions can be corrected before thousands of feet of the printed material on the web, which moves at approximately 1500 feet per minute, is inaccurately processed. The viewing of the moving web should be made continuously since error in the spacing of the color impressions may occur at any time due to many factors, such as slack in the web or stretching thereof between successive rollers.

In the prior art, systems have been developed to determine the accuracy of the spacing of impressions of printed material through the use of optical systems employed for viewing the moving web. Usually, at the same time the color impressions are printed, a color register mark is printed having each color comprising a part of a geometric arrangement, and when the spacing is inaccurate the geometric arrangement will be distorted. In using the optical systems the pressman must place his face over a viewing tube and look through a series of lenses toward the moving web. Such optical systems employ either a plurality of mirrors on a rotating cam in an attempt to follow each of the color register marks for a distance of approximately three to four feet, or an optical system employing a stroboscopic light to illuminate the color register marks which the pressman attempts to view through an optical viewer. Because of the high speed at which the web travels, it is extremely difficult to get an accurate image of the color register marks as the marks flash by the viewer. In addition, the optical viewing systems cause eye strain and other discomfort to the pressman making the examination of the color register marks. Also with the use of optical viewing systems, it is difficult to provide such a system which is capable of scanning the color register marks during the period when the web initially starts moving until high speed of the web has been reached.

In accordance with the present invention, an apparatus for monitoring a high speed process is provided which does not restrict the pressman to a predetermined position while viewing the moving web. The present invention provides a new and improved viewing arrangement whereby one or more persons may view the color register marks at any desired location away from the moving web. With the use of the present invention, a bright light source or flashes of light used to illuminate the color register mark passing on the moving web is eliminated from the view of the pressman. The present invention provides a system in which the image of the color register marks may be retained on the viewing apparatus after the mark has passed by the apparatus, thereby providing retention of the mark for an accurate determination of spacing for color impressions of the printed material.

More particularly, according to the features of the present invention, an apparatus for monitoring a high speed process having a periodically repeating pattern is provided comprising sensing means for sensing the periodically repeating pattern and for producing a control pulse signal upon sensing of each of the patterns. The present invention employs a stroboscopic light source which is responsive to the control pulse signal produced by the sensing means for energizing the light source to illuminate the pattern sensed. The system of the present invention is provided with a television camera for receiving an image of each periodically repeating pattern when illuminated by the stroboscopic light source. Also employed is a television monitor for reproducing the image picked up by the television camera, the television camera and television monitor being part of a closed television circuit.

In accordance with a further feature of the present invention, the television camera is provided with an image tube having long persistence characteristics for retaining the image of the color register marks after the pattern has been illuminated and passed from the angle of view of the television camera. In this manner the color register marks may be viewed for a period long enough for an accurate determination of the spacing of color impressions of the printed material.

In accordance with another feature of the present invention, switch means is provided for producing a trigger pulse signal, and switch actuator means is employed associated with the occurrence of each of the periodically repeating patterns at the sensing means, for actuating the switch means to produce the trigger pulse signal at each of the occurrences of the pattern. Gate means is also employed which electrically connects the sensing means and the stroboscopic light source, the gate means being responsive to each of the control pulse signals for producing an output pulse signal to energize the stroboscopic light source when both one of the control pulses and one of said trigger pulses are received synchronously by the gate means. In this manner, the sensing means is prevented from producing a control pulse signal which will energize the stroboscopic light source when patterns on the web, for example, other than the color register marks, are sensed.

In accordance with still another feature of the present invention, a second gate means is employed to electrically connect the television camera to the television monitor. This gate means is responsive to the output pulse signal, produced by the first mentioned gate means, for preventing video signal from passing from the television camera to the television monitor when the stroboscopic light source is being energized by the output pulse signal. By this arrangement, the video signal from the television camera is interrupted during the flash duration of the stroboscopic light source, thereby preventing a brightening of the picture on the television monitor. This eliminates any eye discomfort to the pressman which might have been caused during the flash of light created by the light source.

As still a further feature of the present invention, optical means is employed with the television camera for providing a variable angle of view for the camera. Also employed is actuator means for changing the optical means to provide a large angle of view for the camera when the high speed process is accelerating to or decelerating from its high speed and to provide a small angle of view for the camera when the high speed process is operating at its high speed.

In addition, the present invention provides an improved color register mark which enables a new process of monitoring color impressions on the moving web in a multicolor printing press.

For a better understanding of these and other features and advantages of the present invention, reference is made to the following description and accompanying drawings, in which.

The apparatus of the present invention for monitoring periodically repeating patterns moving at high speed, although capable of use in monitoring a wide variety of different high speed processes, is shown and described monitoring color registration on a moving web of paper as it passes through a multicolor printing press.

Monitoring is accomplished by observing a selected portion within each repeat length of the periodically repeating pattern. Sensing means is provided for scanning a region of the pattern and producing a control pulse signal upon detecting a predetermined repeating part of the pattern within each repeat length. Responsive to the control pulse signal is a stroboscopic light which is energized to illuminate at least a selected portion of the pattern. The television camera is provided in position to receive an image of said selected portion of the pattern when illuminated by the stroboscopic light source. A television monitor connected to the camera by a closed television circuit, reproduces an image of the selected portion on the monitor. In some embodiments discrimination against signals which might otherwise produce unwanted energization of the stroboscopic light is obtained by the use of a trigger pulse with which the control pulse must coincide for energization of the light.

Figure 1:
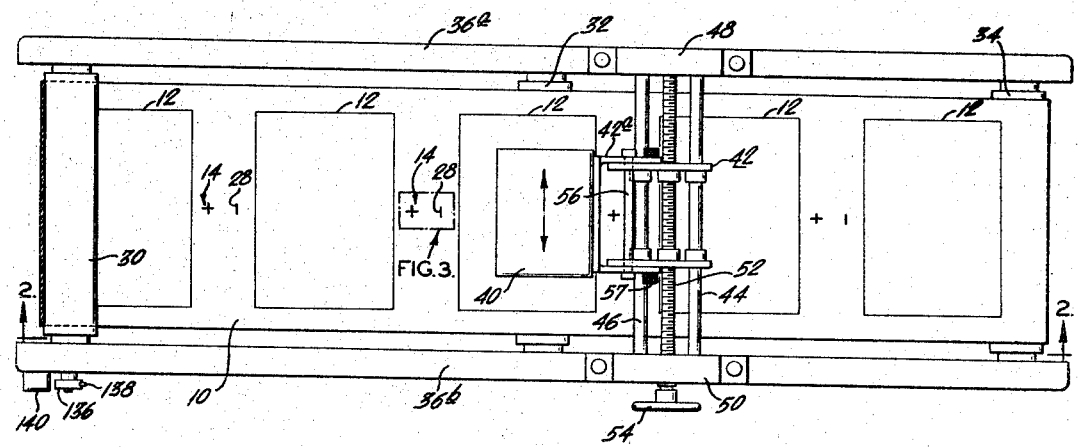
FIG. 1 is a diagrammatic view of a portion of a printing press employing the apparatus of the present invention.
Figure 2:
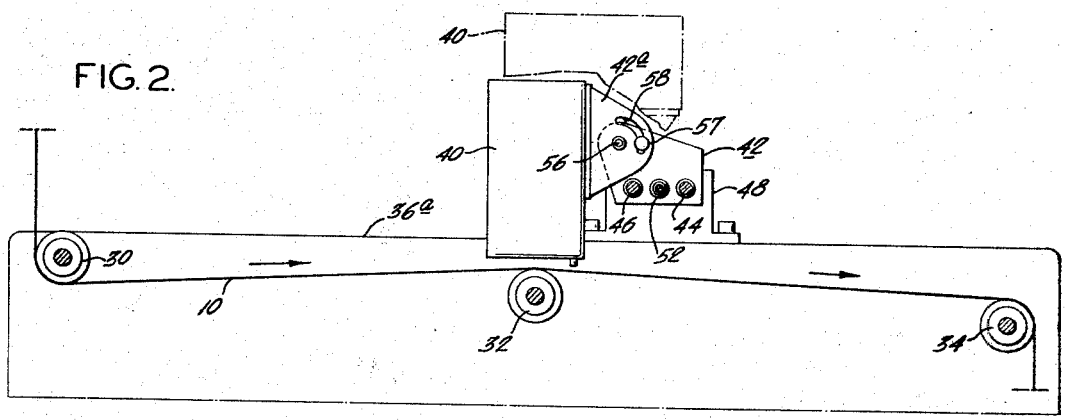
FIG. 2 is a sectional view taken along the line 2—2 of FIG. 1.

Referring now to the embodiment of the invention illustrated in FIGS. 1 and 2, the invention is shown in use on a printing press. There is illustrated a moving web of paper 10 on which repetitive multicolor prints generally designated 12 have been made by a plurality of color rollers (not shown). In addition to each color roller printing its respective color of the print 12, the engraved plate on each roller is engraved with a mark which comprises part of a repetitive color register mark generally designated 14 printed on the web of paper 10. The portion of the color register mark 14 printed by each color roller is printed in the color associated with the respective color roller.

Figure 3:
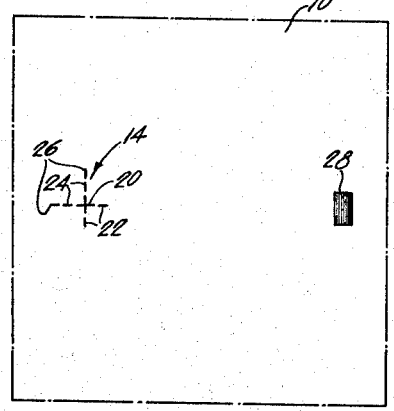
FIG. 3 is a magnified plan view of the area encompassed by the broken line shown in FIG. 1.
Figure 4:
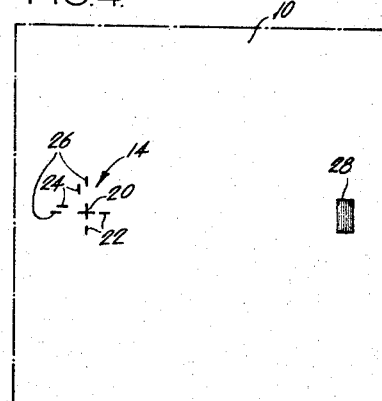
FIG. 4 is a plan view similar to that of FIG. 3, showing an irregular pattern of the color register mark.

More particularly, the color register mark 14 of the present invention is shown more clearly in the magnified view of FIG. 3. As previously stated, the color register mark 14 comprises a plurality of marks of the individual colors used in the multicolor print, each color being represented by two marks oriented on mutually perpendicular axes. For example, if yellow, red, blue and black inks are used in creating the multicolor print 12, yellow may be used to print the crossed lines 20, black may be used to print the dash lines 22, red may be used to print the dash lines 24 and blue may be used to print the dash lines 26. The pairs of perpendicularly oriented dash lines associated with each color are oriented with respect to each other to form a cross when proper alignment and spacing of the color impressions is achieved. Each line of the pair of dash perpendicularly oriented lines associated with a particular color will appear in the same spaced relationship one to the other, but the pairs of lines for each color may respectively be aligned or out of alignment with respect to corresponding lines of each other pair of lines, depending on the accuracy of spacing of the associated color impression on the web. For example, as shown in FIG. 4, there is illustrated an irregular pattern of the color register mark. The red pair of perpendicularly oriented lines are shown out of alignment in two directions, lagging in the direction of web travel from its proper spaced relation and displaced transverse to the direction of web travel from its proper spaced relation. When one or more colors are out of alignment, the color register mark will not have aligned arms forming a cross but will have one or both arms distorted, as in the present instance of FIG. 4, indicating the inaccuracy of the printing of the red color in two directions resulting in distortion of both arms.

The distortion of the present color register mark indicates the amount of distortion occurring in the print 12 and the color or colors creating the distortion of the print. Through the use of the pairs of perpendicularly oriented color register lines with their arrangement in the cross-like color register mark, any displacement of their associated colors in the color print is readily discernible, whether the displacement be in the direction of travel of the moving web or transverse thereto. The viewing of the color register mark of the present invention enables accurate determination of off-register conditions in any color to an accuracy as great as a few thousandths of an inch. Also, the present color register mark can be used to maintain a corrective measure if it is found that the printed picture is more life-like when, for example, one of the colors is kept a predetermined amount out of proper alignment.

After a determination of the direction and amount of displacement of a color or colors from the proper spaced relation has been made, the correction of the inaccuracy in spacing can be made by any of the conventional methods known in the art of printing. For example, the particular color roller which is in error in the spacing of its impression can be increased or decreased in speed of rotation or displaced in either direction transverse to the direction of travel of the web. Idler rollers can also be employed to increase or decrease the slack in the web between successive color rollers to make adjustment for spacing of color impressions.

As can be seen in FIG. 3, the color register mark 14 has associated with it a reference mark 28, which is preferably printed by the black color roller when the black pair of color lines and black impression of the print 12 is printed. The reference mark 28 is printed to precede its associated color register mark 14 on the moving web by a predetermined distance and is used for actuating the monitoring apparatus for accurate viewing of the color register mark as will be explained more fully hereinafter.

Referring back to FIGS. 1 and 2, the web of paper 10 is shown moving downwardly and under roller 30 and over rollers 32 and 34. Rollers 30, 32 and 34 are supported on each side by a suitable support structure generally designated 36a and 36b, respectively, on opposite sides of the rollers. As can be seen more clearly in FIG. 2, after the web travels around roller 32, it proceeds in an upwardly direction over roller 32 and a downwardly direction over roller 34, such that the web is pulled taut in traveling upwardly over roller 32. By this arrangement, the paper in passing over roller 32 will be free from ripples or wavering so that an accurate viewing of the repetitive color register marks can be made above roller 32. For this reason a housing 40 containing the web inspection portion of the monitoring apparatus of the present invention is positioned over roller 32. The housing 40 is shown having a box-like shape with an open bottom adjacent the moving web. Housing 40 is mounted for axial movement relative to roller 32 and transverse to the direction of travel of the moving web so that the apparatus may be properly aligned over the color register marks on the moving web.

As can be seen, housing 40 is supported above the moving web by a carriage 42. Carriage 42 is supported for movement by feed shafts 44 and 46, which are supported transverse to the moving web by vertical stocks 48 and 50 mounted on support structures 36a and 36b, respectively. Carriage 42 is moved along the parallel feed shafts 44 and 46 by means of lead screw 52 threaded through the carriage and rotatably supported between the feed shafts by stocks 48 and 50. The end of the lead screw 52 supported by stock 50 extends through the stock and is provided with a handwheel 54 attached to the lead screw for imparting rotation thereto to move carriage 42 along feed shafts 44 and 46. The portion of the carriage which supports housing 40 comprises a bracket 42a, which has a flat portion to which the housing 40 is attached and has its ends bent perpendicular to the flat portion to fit adjacent opposite sides of the remainder of the carriage. The bracket 42a is rotatably supported about shaft 56 and can be adjusted to different angular positions, as shown by the alternative positions in FIG. 2, by loosening screws 57 in slots 58 in the ends of the bracket. This range of movement of the bracket and housing is desirable to provide freedom of movement of the housing so as to permit positioning of the housing perpendicular to the moving web and also to permit maintenance of the equipment in housing 40.

Figure 5:
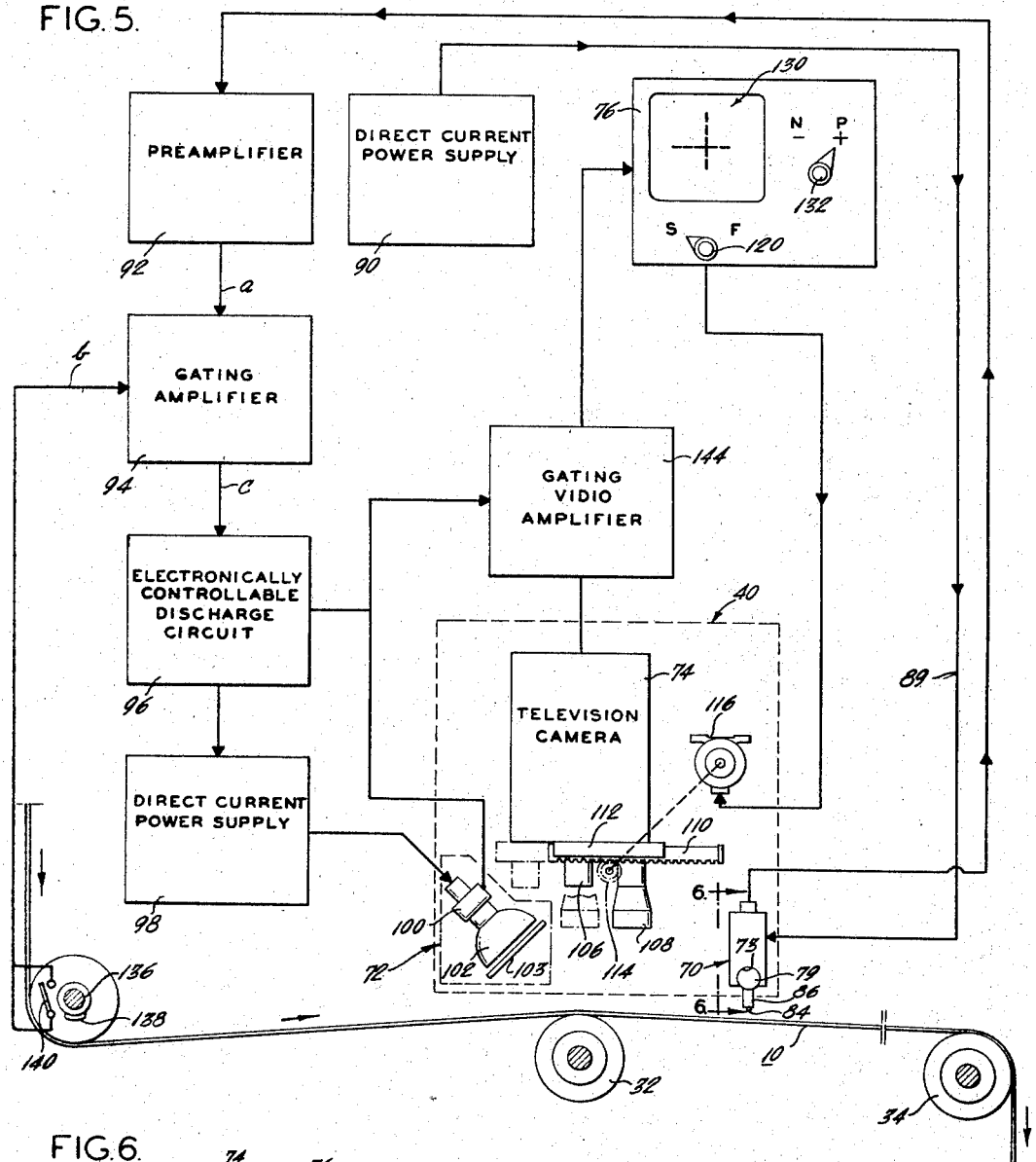
FIG. 5 is a schematic diagram illustrating an overall system embodying the present invention.

FIG. 5 is a schematic diagram illustrating an overall system embodying the present invention. As can be seen therein, the housing 40 shown in dotted lines supports the web inspection portion of the monitoring apparatus above web 10 over roller 32. Housing 40 also provides a light shield to prevent ambient light from affecting the web inspecting process. The web inspection portion of the monitoring apparatus comprises a sensing head 70 which produces a control pulse signal upon sensing of the reference mark. This control pulse signal is supplied through associated circuitry (to be explained hereinafter) to a stroboscopic light source 72 which is responsive to the pulse for illuminating the color register mark which will then be passing over roller 32 on web 10. The image of the color register marks is picked up by a television camera 74 which supplies a video signal through associated circuitry to a television monitor 76 which reproduces the image for viewing of the color register marks.

Figure 6:
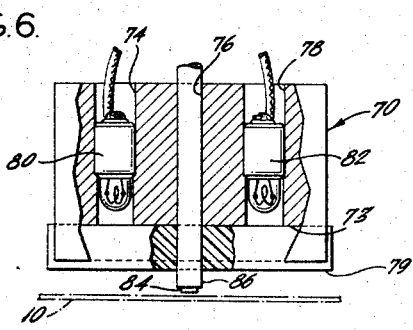
FIG. 6 is a side elevational view, partially in section, of the sensing means taken along the line 6—6 of FIG. 5.

More specifically, the sensing head 70, shown in detail in FIG. 6, comprises a rigid support housing which may be made from a generally rectangular block of metal. The housing of sensing head 70 is oriented to have its longest dimension transverse to the direction of travel of the moving web, and is provided with a cylindrical bore 73 extending the legnth of the housing along the bottom and communicating with the outside along a chord of the cylindrical surface. The housing is also formed with three parallel bores 74, 76 and 78, which intersect the axial length of bore 73 perpendicularly extending the height of the housing and communicating with bore 73.

A cylindrical plexiglass rod 79 is positioned in cylindrical bore 73 to extend the enitre length thereof, with the rod protruding on both sides of the housing. In bores 74 and 78 there is positioned small incandescent lamps 80 and 82, respectively. The lamps provide light which is transmitted through the plexiglass rod 79 and the opening along the axial length of bore 73, the light being interrupted by the moving web in the form of a narrow strip of illumination.

The central bore 76 in the housing of the sensing head is extended through the plexiglass rod and there is positioned in bore 76 a generally circular array of optical fibers 84 in a tubular rubber sleeve 86. The optical fiber array is oriented perpendicular to the moving web at one end, the end protruding from the plexiglass rod to adjacent the moving web, and the other end of the fiber array is extended through the top of the housing and is terminated at a photoelectric cell (not shown) in a conventional manner. Such a fiber array and associated photocell arrangement may be of the type manufactured by the American Optical Company of Southbridge, Mass.

Lamps 80 and 82 in sensing head 70 are connected in a conventional manner through electrical coductors 89 to a direct current source of power generally designated 90 in FIG. 5. A standard direct current power supply having a full-wave rectifier circuit may be employed so that a constant direct current source of power is provided for constant illumination by the lamps, thereby eliminating flickering thereof. The sensing head may be built having dimensions such that the lamps produce a strip of light therebeneath approximately ⅓ inch wide and 2 inches in length. The end of the fiber array beneath the sensing head is preferably positioned ⅛ to ½ inch from the web.

With the web illuminated constantly by the lamps 80 and 82, the optical fibers in the fiber array 84 will pick up and transmit some of the diverted light reflected from the web into the fibers, the reflected light picked up by the fibers being transmitted to the photoelectric cell associated therewith. When the fiber array is over the white web, light will be reflected from the sheet; but if the fiber array is over a dark reference mark, very little light, if any, will be reflected from the web, and hence a different signal will be produced by the photoelectric cell associated with the fiber array. The different signal produced by the photoelectric cell constitutes a control pulse signal which is supplied to a transistorized preamplifier 92 of a conventional type. The output of the preamplifier is supplied to a gating amplifier 94 to be explained more fully hereinafter. The amplified output signal from the gating amplifier is supplied to an electronically controllable discharge circuit 96. The electronically controllable discharge circuit 96 may comprise, for example, a silicon controlled rectifier (not shown) across which a capacitor may be connected which is charged by a direct current power supply 98. The electronically controllable discharge circuit is responsive to the output signal of gating amplifier 94 to render the silicon-controlled rectifier conductive so that the capacitor may be discharged supplying an output signal which is supplied to a spark coil 100 of a xenon flash tube 102 which comprises the stroboscopic light source 72. The spark coil 100 in response to the output signal of the discharge circuit 96 triggers the flash tube 102, which has a potential applied thereacross by direct current power supply 98, to ionize the gas in the flash tube to produce illumination of the moving web thereneath. The flash tube preferably illuminates the moving web for a period on the order of three microseconds. The short duration of the "on" time of the stroboscopic light source is for better resolution of the color register mark picked up by the television camera 74, so that movement of the register mark on the moving web is eliminated from pickup by the television camera. The stroboscopic light 72 is arranged at a distance from the sensing head 70 such that upon the sensing head producing a control pulse signal which is used to trigger the stroboscopic light source, the illumination produced thereby will be at such a position along the web as to illuminate the color register mark, as previously explained. The image of the color register mark on the television monitor may be made more distinct by providing a color filter 103 between flash tube 102 and the web 10. The use of a medium blue filter, for example, has been found to make yellow register lines appear more distinct on the monitor.

The television camera 74 is arranged to be focused upon the moving web at the area which is illuminated by the stroboscopic light source 72. By this arrangement, the periodically repeating color register marks illuminated by the stroboscopic light source will be picked up by the television camera 74 to be displayed on the television monitor 76, the television camera and television monitor being part of a closed television circuit.

The television camera is shown in FIG. 5 having a first lens system 106 and a second lens system 108 which are used alternatively to focus the camera for pickup of the color register mark. The lens systems 106 and 108 are supported on a rack 110 which is movable along guide 112 between positions where lens 106 is employed to focus the camera and a position in which lens 108 is employed to focus the camera. The alternate positions assumed in the course of movement of the rack is shown in FIG. 5. The rack is moved between positions by pinion 114 which is mechanically coupled for movement to motor 116 which is supported by housing 40.

Lens system 106 is preferably of the type which provides the camera with a wide angle of view from the time when the press is initially started until the web has reached high speed, at which time the motor 116 is actuated to move the other lens system 108 to the position for focusing the camera in order to provide a smaller angle of view therefor to obtain maximum magnification of the color register marks when the moving web is traveling at its usual speed of approximately 1500 feet per minute. A switch 120 may be placed on the television monitor 76 with two operative positions, a slow position S and a fast position F for actuating the motor 116 to move the lens system to have lens system 106 focus the camera at slow speed position S and to have the lens system 108 focus the camera at high speed position F of switch 120.

The television camera 74, which is operating continually during the monitoring operation, preferably is provided with an image tube similar to a vidicon tube, such as manufactured by Westinghouse Corporation, Tube Division, having long persistence characteristics to retain 50 percent of the image on the tube for 10 to 15 frames after the "on" period of the stroboscopic light source has ended. In addition, to have the image of each color of the color register mark appear distinctly on the television monitor, the image tube should be of a type having a spectral response providing differentiation between the white web of paper and colors printed thereon. This arrangement permits an extended viewing of the color register mark for an accurate determination of spacing of color impressions.

On the television monitor 76 an image 130 of the color register mark is displayed in response of the video signal from the television camera. The television monitor may be provided with a selection switch 132 having two positions P and N for reversal of polarity of the video signal displayed on the monitor. More specifically, the P position of selection switch 132 would provide a white background with the color register mark appearing dark, and the N position would provide a dark background with the color register mark appearing white on the monitor. The latter position is preferable since the glare of a white background for the color register mark presents a glare to the viewer, whereas the dark background with the register mark appearing as white eliminates glare to the eye of the viewer. This reversal of polarity is especially desirable to compensate for the glare caused by the light burst from the stroboscopic light source.

In accordance with the preferred form of the present invention, there is provided switch means for producing a trigger pulse signal upon the occurrence of each reference mark at the sensing head. The trigger pulse signal produced by the switch means is supplied to the gating amplifier 94 to permit the control pulse signal produced by the sensing head to actuate the gating amplifier to produce the output pulse signal supplied to the electronically controllable discharge circuit. More specifically, as can be seen in FIGS. 1 and 5, the shaft supporting roller 30 is extended beyond support structure 36b and there is supported on the extension a wheel 136 made of a nonferrous material. Located on the periphery of wheel 136 is a permanent magnet 138 which is mounted for rotation with the wheel to actuate a proximity switch 140 supported by support structure 36b, as shown in FIG. 1. As can be seen more clearly in FIG. 5, upon the rotation of wheel 136 as the web moves over roller 30, magnet 138 is brought in close proximity to switch 140 once each revolution of wheel 36, thereby actuating the normally open proximity switch 140 closed upon each such ocurrence. By this arrangement, the magnet closes the contact of proximity switch 140 completing a circuit to produce a trigger pulse signal supplied to the gating amplifier 94. The occurrence of the magnet adjacent the proximity switch to actuate the switch closed is synchronized with the occurrence of each reference mark beneath sensing head 70 by adjusting the diameter of wheel 136 and the position of magnet 138 thereon to have switch 140 actuated at such occurrences.

Gating amplifier 94 may be a transistorized power amplifier of such a type that when a trigger pulse signal is received from actuation of switch 140 and a control pulse signal is received from the sensing head 70, an output signal will be produced. More specifically, if a control pulse signal is received at input $a$ in absence of a trigger pulse signal at input $b$, no output will be provided at output terminal $c$ thereof. However, when a trigger pulse signal is received at terminal $b$ and a control pulse signal is received at terminal $a$, an output pulse signal will be produced at output terminal $c$. By this arrangement, if the sening head is actuated to produce a control pulse signal by printed material on the moving web other than the reference mark, the control pulse signal will not actuate the gating amplifier 94 to produce an output signal. Hence, the stroboscopic light source is prevented from being energized except when both switch 140 and sensing head 70 produce signals in response to the occurrence of the reference mark beneath the sensing head on the moving web.

In accordance with a further feature in the preferred embodiment of the invention, a gating video amplifier 144 is provided connected between the television camera 74 and television monitor 76. Gating video amplifier 144 is responsive to the output pulse from the electronically controllable discharge circuit 96 to interrupt the video signal from the television camera to the television monitor during the flash duration of the stroboscopic light 72. This arrangement eliminates a brightened image on the television monitor at the time the stroboscopic light illuminates the moving web. The gating video amplifier shown in FIG. 5 may be a transistorized video amplifier of a conventional type which is adapted to interrupt its output signal in response to receiving a signal from the electronically controllable discharge circuit. Immediately after the stroboscopic light source has returned to its off condition, the gating video amplifier resumes transmitting the video signal of the image of the color register mark retained on the image tube in the television camera.

In the operation of the system of FIG. 5, as the moving web travels beneath at housing 40, the repetitive color register marks and associated reference marks will move beneath apparatus contained in the housing. As each reference mark comes in proximity to the sensing head 70, proximity switch 140 will be actuated by magnet 138 thereby producing a trigger pulse signal applied to gating amplifier 94. At the same time interval, the reference mark will be beneath sensing head 70 to cause a change in output thereof producing a control pulse signal which is supplied to the preamplifier 92 to provide an amplified signal to gating amplifier 94. When the above occurs, the gating amplifier in response to the trigger pulse signal and the control pulse signal will produce an output signal supplied to the electronically controllable discharge circuit 96. The discharge circuit 96 in response to the output signal of gating amplifier 94 will produce a signal supplied to spark coil 100 and gating video amplifier 144. This signal from the discharge circuit supplied to the spark coil triggers the flash lamp of the stroboscopic light to provide a burst of light to illuminate the color register mark, which at this instance will be within the angle of view of television camera 74. The image of the illuminated color register mark will be picked up by camera 74 and retained on the image tube in the camera.

The output signal from the discharge circuit 96 supplied to gating video amplifier 144 interrupts the video signal from the television camera to the television monitor during the interval of the burst of light from the stroboscopic light source, thereby eliminating a bright flash from being observed on the television monitor 76. After the illumination of the stroboscopic light source has subsided and the color register mark has traveled a distance from the angle of view of the television camera, the video signal from the television camera will again be supplied through the gating video amplifier to the television monitor where the image of the color register mark is displayed thereon.

The proper sequence of timing is achieved by the spacing between the color register mark and the reference mark, the positioning of magnet 138 on wheel 136 with respect to the occurrence of reference marks on the moving web at sensing head 70, and the spacing between the sensing head 70 and television camera 74. By this arrangement the proper timing for providing the trigger pulse signal to the gating amplifier in synchronism with supplying the control pulse signal to the gating amplifier to provide an output signal to energize the stroboscopic light source is achieved at the time the color register mark is within the angle of view of television camera 74.

It will be observed that the apparatus for monitoring color register marks of the present invention using a closed television circuit provides advantages over the prior art. A structure is provided capable of trouble free operation, one which does not restrict the user to the predetermined position while viewing the moving web, and a system which eliminates bright flashes of light used to illuminate the moving web from the eyes of the viewer. Moreover, it will be seen that the system of the present invention provides an image of the color register mark which is retained for viewing by the operator and eliminates flicker effect for an accurate determination of spacing of color impressions of the printed material. Also, through the use of the apparatus of the present invention, accurate viewing of the color register mark may be made at any speed of movement of the web beneath the apparatus.

The present invention provides the capability of simultaneous monitoring of a printed register mark on both sides of a moving web and displaying the impressions for an accurate comparison and determination of alignment of previously printed material on one side of the web to material being printed on the other side.

While the invention has been described with particular reference to a specific embodiment thereof, it will be understood that it may be embodied in a large variety of forms different from the one specifically shown and described without departing from the scope and spirit of the present invention as defined by the appended claims.

I claim:

1. An apparatus for monitoring a periodically repeating pattern moving at high speed by observing a selected portion within each repeat length of said pattern comprising: a supporting frame relative to which the pattern moves; sensing means supported by said frame for scanning a region of said pattern and for producing a control pulse signal upon sensing a predetermined repeating part of said pattern within each repeat length; switch means for producing a trigger pulse signal; switch actuator means associated with occurrence of said pattern at said sensing means for actuating said switch means to produce said trigger pulse signal at each of said repeat lengths of said pattern; gate means responsive to said control pulse signal for producing an output pulse signal when both one of said control pulses and one of said trigger pulses are received synchronously by said gate means; a stroboscopic light source supported by said frame responsive to said output pulse signal for energizing said stroboscopic light source to illuminate at least a selected portion of said pattern; a television camera supported by said frame for receiving an image of said selected portion of said pattern when illuminated by said stroboscopic light source; and a television monitor for reproducing said image on said monitor; said television camera and television monitor being part of a closed television circuit.

2. The apparatus of claim 1 further comprising a second gate means electrically connecting said television camera and said television monitor and responsive to said output pulse signal for interrupting video signal passing from said television camera to said television monitor when one of said output pulses is being received by said second gate means.

3. An apparatus for monitoring a moving web having a periodically repeating pattern including a register mark thereon used with a multicolor printing press having a plurality of rollers over which said web travels and from which said pattern is printed, comprising: a support frame relative to which said web moves; a housing mounted over said web on said frame to be selectively movable relative to said frame and having an open portion adjacent said web; means for moving said housing relative to the frame in a direction transverse to the movement of said moving web for positioning said housing over said periodically repeating register mark; sensing means mounted in said housing for sensing a predetermined portion of said periodically repeating pattern and for producing a control pulse signal upon sensing of each of said predetermined portion; switch means supported adjacent one of said rollers for producing a trigger pulse signal; switch actuator means mounted on said one of said rollers for actuating said switch means for producing said trigger pulse signal at each occurrence of said predetermined portion at said sensing means; gate means responsive to said control pulse signal for producing an output pulse signal when both one of said control pulses and one of said trigger pulses are received synchronously by said gate means; a stroboscopic light source mounted in said housing responsive to said output pulse signal for energizing said stroboscopic light source to illuminate said register mark; a television camera mounted in said housing for receiving an image of said register mark when illuminated by said stroboscopic light source; and a television monitor for reproducing said image on said monitor, said television camera and said television monitor being part of a closed television circuit.

(References on following page)

References Cited

UNITED STATES PATENTS

| | | | |
|---|---|---|---|
| 2,524,926 | 10/1950 | Peery. | |
| 2,798,605 | 7/1957 | Richards | 178—6 |
| 3,033,109 | 5/1962 | Frommer | 250—219 |
| 3,111,555 | 11/1963 | Dykeman | 178—6.8 |
| 3,313,942 | 4/1967 | Lange | 250—219 |

FOREIGN PATENTS 682,892  3/1964  Canada.

ROBERT L. GRIFFIN, *Primary Examiner.*

JOSEPH A. ORSINO, JR., *Assistant Examiner.*

U.S. Cl. X.R.

178—6; 250—219